United States Patent
Gao et al.

(10) Patent No.: US 11,216,198 B2
(45) Date of Patent: Jan. 4, 2022

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Jian Gao, Beijing (CN); Shaoqin Gong, Beijing (CN); Lifeng Yang, Beijing (CN); Xinlei Xu, Beijing (CN); Xiongcheng Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 112 days.

(21) Appl. No.: 16/582,476

(22) Filed: Sep. 25, 2019

(65) Prior Publication Data

US 2020/0133493 A1 Apr. 30, 2020

(30) Foreign Application Priority Data

Oct. 30, 2018 (CN) .......................... 201811278806.1

(51) Int. Cl.
*G06F 3/06* (2006.01)

(52) U.S. Cl.
CPC ............ *G06F 3/064* (2013.01); *G06F 3/0611* (2013.01); *G06F 3/0617* (2013.01); *G06F 3/0631* (2013.01); *G06F 3/0646* (2013.01); *G06F 3/0689* (2013.01)

(58) Field of Classification Search
CPC .... G06F 3/0607; G06F 3/0611; G06F 3/0617; G06F 3/0631; G06F 3/064; G06F 3/0646; G06F 3/0689

USPC ................................ 711/114, 165; 714/6.22
See application file for complete search history.

(56) References Cited

U.S. PATENT DOCUMENTS

| | | | |
|---|---|---|---|
| 6,530,004 B1 * | 3/2003 | King | G06F 11/1096 711/114 |
| 10,229,022 B1 | 3/2019 | Gao et al. | |
| 10,831,604 B2 | 11/2020 | Han et al. | |
| 10,997,025 B2 | 5/2021 | Zhang et al. | |
| 2007/0011401 A1 * | 1/2007 | Zhang | G06F 11/1092 711/114 |
| 2016/0306574 A1 * | 10/2016 | Friedman | G06F 3/0638 |

* cited by examiner

*Primary Examiner* — Gary J Portka
(74) *Attorney, Agent, or Firm* — BainwoodHuang (57) ABSTRACT

A technique involves: in response to receiving a first request for adjusting a first width of a disk array to a second width, obtaining, based on source identification information of a source stripe group in the disk array in the first request, source block identification information of a source block associated with the source stripe group. The technique further involves: determining destination identification information of a destination stripe group associated with the second width for storing data. The technique further involves: storing, based on the source identification information and the destination identification information, source data and metadata for the source data from the source block into a destination block of the destination stripe group, the metadata including node identification information for accessing nodes of the source block. The technique further involves: adjusting the node to access the destination block based on the node identification information.

14 Claims, 8 Drawing Sheets

METHOD, DEVICE AND COMPUTER PROGRAM PRODUCT FOR DATA PROCESSING

CROSS-REFERENCE TO RELATED APPLICATION

This application claims priority to Chinese Patent Application No. CN201811278806.1, on file at the China National Intellectual Property Administration (CNIPA), having a filing date of Oct. 30, 2018, and having "METHOD, DEVICE AND COMPUTER PROGRAM PRODUCT FOR DATA PROCESSING" as a title, the contents and teachings of which are herein incorporated by reference in their entirety.

FIELD

Embodiments of the present disclosure generally relate to the field of data storage, and more specifically, to method, device and computer program product for data processing.

BACKGROUND

Redundant Array of Independent Disks (RAID) is a disk group formed by combining a plurality of independent disks in different ways. From the user's perspective, the Redundant Array of Independent Disks is similar to a disk, but can provide higher storage capacity than the single disk and can also offer data backup. When data in a disk extent is damaged, the damaged data can be recovered using data backup, which protects the security of user data. Different compositions schema of the disk array are referred to as RAID Levels, such as RAID 0, RAID 1, RAID 5 and the like.

With the development of RAID technology, data read and write are performed at the level of disk slice instead of a disk. According to this technology, each of a plurality of disks is divided into multiple disk slices. The RAID is created in units of disk slices to more flexibly realize disk management and I/O control and improve the operation performance of the system. However, more disks are used for data storage as the price of the storage disk reduces. Therefore, the problem about how to utilize more disks to store data exists in the RAID.

SUMMARY

Embodiments of the present disclosure provide method, device and computer program product for data processing.

In accordance with a first aspect of the present disclosure, there is provided a method of data processing. The method comprises: in response to receiving a first request for adjusting a first width of a disk array to a second width, obtaining, based on source identification information of a source stripe group in the disk array in the first request, source block identification information of a source block associated with the source stripe group. The method also comprises: determining destination identification information of a destination stripe group associated with the second width for storing data. The method further comprises: storing, based on the source identification information and the destination identification information, source data and metadata for the source data from the source block into a destination block of the destination stripe group, the metadata including node identification information for accessing nodes of the source block. The method also comprises: adjusting the node to access the destination block based on the node identification information.

In accordance with a first aspect of the present disclosure, there is provided an electronic device for accessing services. The electronic device comprises: a processor; and a memory having computer program instructions stored thereon, the processor executing the computer program instructions in the memory to control the electronic device to perform acts comprising: in response to receiving a first request for adjusting a first width of a disk array to a second width, obtaining, based on source identification information of a source stripe group in the disk array in the first request, source block identification information of a source block associated with the source stripe group; determining destination identification information of a destination stripe group associated with the second width for storing data; storing, based on the source identification information and the destination identification information, source data and metadata for the source data from the source block into a destination block of the destination stripe group, the metadata including node identification information for accessing nodes of the source block; and adjusting the node to access the destination block based on the node identification information.

In accordance with a third aspect of the present disclosure, there is provided a computer program product. The computer program product is tangibly stored on a non-volatile computer-readable medium and comprises machine-executable instructions which, when executed, cause a machine to perform steps of the method according to the first aspect of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

In each drawing, same or corresponding reference signs indicate same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more details with reference to the drawings. Although the drawings illustrate some embodiments of the present disclosure, it should be appreciated that the present disclosure can be implemented in various manners and should not be limited to the embodiments described herein. On the contrary, the embodiments are provided to understand the present disclosure in a more thorough and complete way. It should be appreciated that drawings and embodiments of the present disclosure are only for example purposes rather than restricting the protection scope of the present disclosure.

In the descriptions of the embodiments of the present disclosure, the term "includes" and its variants are to be considered as open-ended terms that mean "includes, but is not limited to." The term "based on" is to be understood as "based at least in part on." The terms "one embodiment" and "this embodiment" are to be read as "at least one embodiment." The terms "first", "second" and so on can refer to same or different objects. The following text also can comprise other explicit and implicit definitions.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

When a disk array is initially constructed, users choose a smaller disk array width, e.g., 4+1 RAID5, due to the limited number of disks, wherein the width of the disk array is the number of disks which form stripes in the disk array. However, as the storage data in the disk array increase, users may insert new storage disks into the disk array to expand the storage. Therefore, it is required to solve the problem about how the storage capacity of the entire disk array is improved by changing its structure, i.e., combining a newly inserted disk with original storage disks.

The processing for the increased disks usually includes RAID migration, wherein the migration procedure generally only involves static transfer of data. During the transfer of data, external operations on the data are ceased. In this case, it is inconvenience for the disk arrays which are currently providing services, and the service capability is also degraded at the meantime. Hence, it is also required to address the problem about how to adjust the disk array without affecting the use of the disk array.

To solve the above problems, a method for data processing is proposed by the present disclosure. In this method, the issue of disk increase is addressed by dynamically adjusting the width of the disk array. The storage efficiency of the disk array is improved as the width of the disk array increases. In addition, the method is dynamically executed, which means that the width of the disk array can be adjusted without interrupting the use of the data in the disk array by an external component. Therefore, the method also improves the service-providing capability of the disk array.

Figure 1:
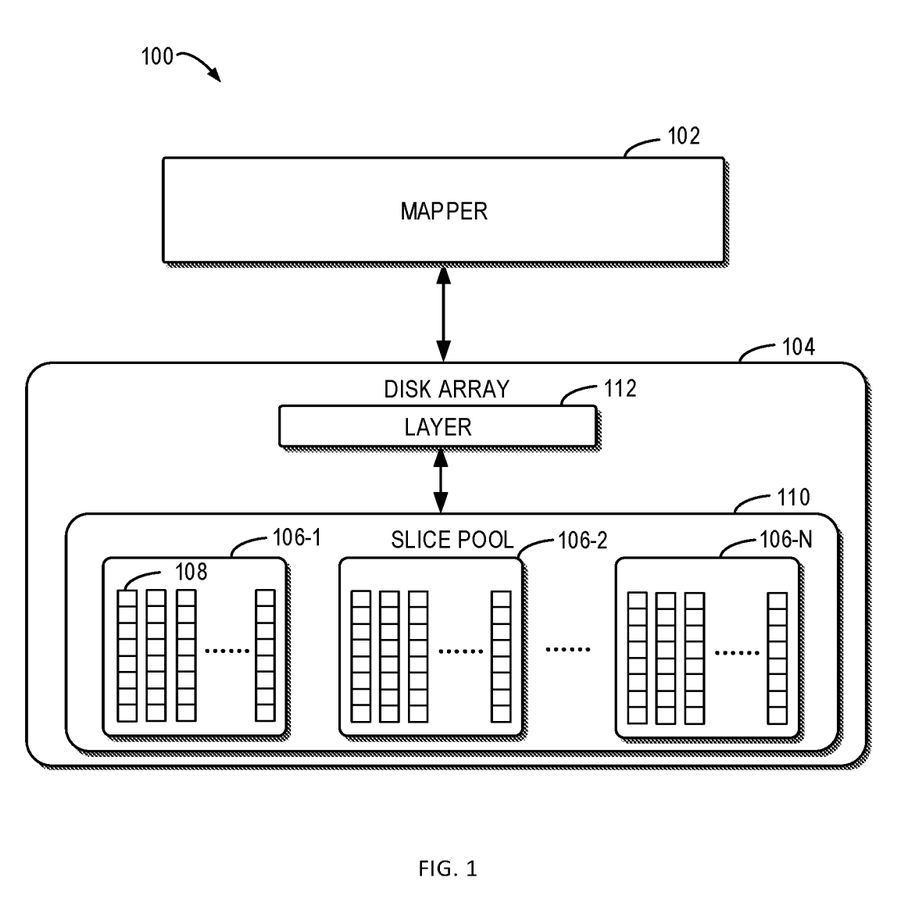
FIG. 1 graphically illustrates a schematic diagram of an example environment 100 where device and/or method according to the embodiments of the present disclosure can be implemented.

FIG. 1 illustrates an architecture diagram of a storage system 100 in accordance with embodiments of the present disclosure. As shown in FIG. 1, the storage system 100 includes a mapper 102, which is used for mapping an address in a user request to a physical space for data storage to facilitate users to read or write the data.

The mapper 102 can provide a predetermined size of logical storage space for an upper-layer application. In some examples, the logical storage space can be 8EB. The above example is provided only for explaining the size of the provided logical storage space, rather than restricting the present disclosure. Any size of logical storage space can be set based on the requirements.

Any suitable structures can be adopted to maintain the mapping between logical addresses and physical addresses in the mapper 102. In one example, the mapping between logical addresses and physical addresses is maintained by B+ tree, wherein the mapping includes mapping from virtual logical blocks to physical blocks, the virtual logical blocks comprises one or more nodes. The above examples are provided only for the purpose of explaining the present disclosure, rather than restricting it. The mapping relation between logical addresses and physical addresses in the mapper 102 can be set as any suitable structures based on the requirements.

In one example, an address of a physical block is stored within a node. In another example, the minimum granularity of the mapping is a 4 KB page. The above examples are provided only for the purpose of explaining the present disclosure, rather than restricting it. Any suitable information associated with the physical blocks can be stored and any size of mapping granularity can be set depending on the requirements.

In one example, upon receipt of a write request, the mapper 102 firstly aggregates enough 4 KB pages to a Physical Large Block (PLB) of 2 MB and then performs the write request in units of physical large blocks. In case of receiving a read request, the mapper 102 can execute the read request in units of physical address smaller than or equal to 2 MB.

The storage system 100 further includes a disk array 104. In one example, the disk array can be a Redundant Array of Independent Disks (RAID). In another example, the disk array can be any suitable types of disk array. The disk array has a predetermined width, the width referring to the number of disks constituting the stripes in the disk array. In one example, the width of the disk array is 4+1 RAID5, which means that the number of disks constituting stripes for the RAID 5 is 4+1, wherein 4 disks store data and one disk stores parity data.

The disk array 104 includes a slice pool 110, which comprises one or more disks 108. Each disk 108 is divided into one or more fixed size disk slices. FIG. 1 illustrates a disk 104 containing eight disk slices. The above examples are provided only for the purpose of explaining the present disclosure, rather than restricting it. In other embodiments, each disk can be configured to include any number of disk slices according to requirements.

The size of the disk slice 106 can be set to any value based on the requirements. In one example, the disk slice 106 is 4 GB. The above examples are provided only for the purpose of explaining the present disclosure, rather than restricting it. In other embodiments, the size of the disk slice 106 can be set according to requirements.

Each disk in the slice pool 110 is assembled to one or more RAID Resilience Sets (RRS) 106-1, 106-2 . . . 106-N (collectively referred to as RAID Resilience Set 106), where N is a positive integer greater than 1.

Slices in the RAID resilience set 106 can be provided for forming one or more stripe groups. In one example, slices in one stripe group all come from one RAID resilience set. One stripe group corresponds to a traditional RAID. In one example, the mapping relation between stripe groups and physical large blocks is stored in the mapper 102. The above examples are provided only for the purpose of explaining the present disclosure, rather than restricting it. The stripe group is described below in details with reference to FIG. 2.

Figure 2:
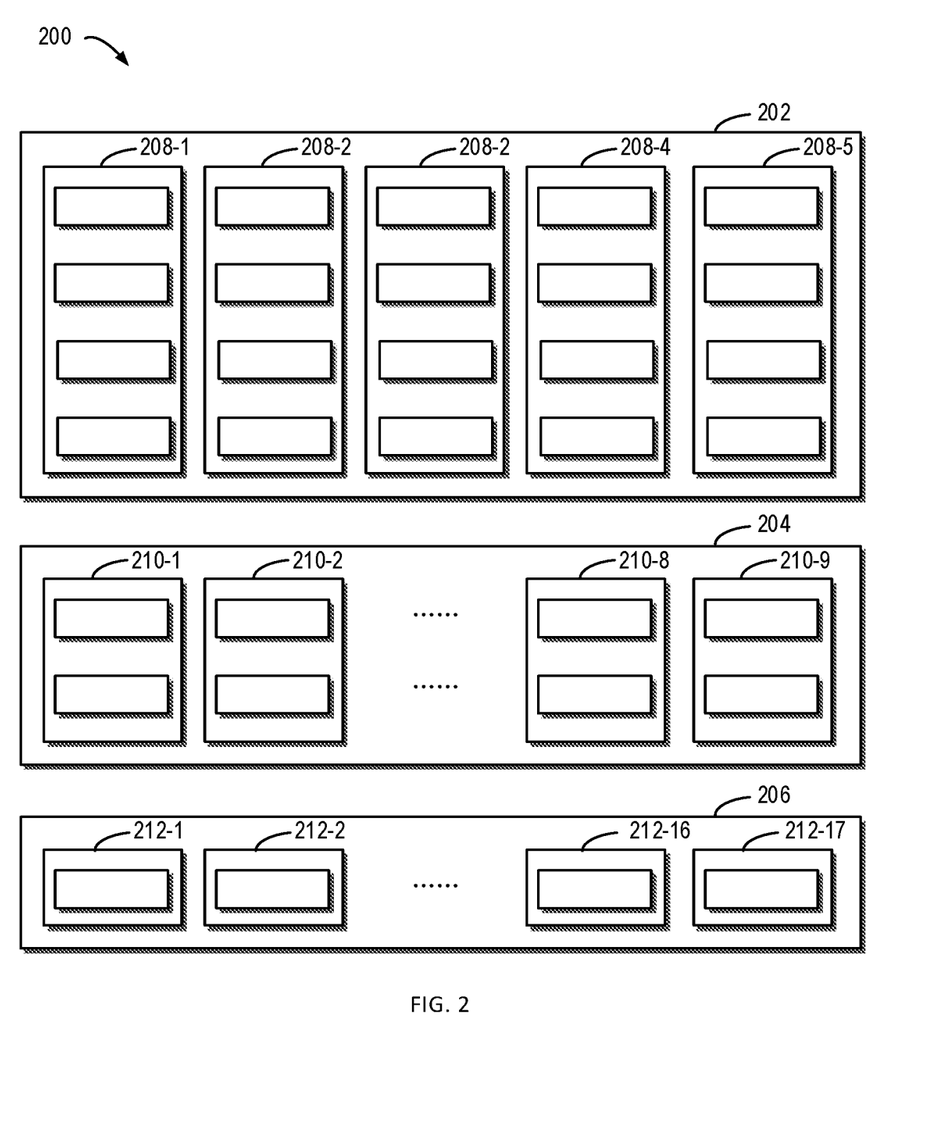
FIG. 2 graphically illustrates a schematic diagram of an example 200 of a stripe group structure in accordance with embodiments of the present disclosure.

FIG. 2 graphically illustrates an example of the stripe group setting. The size of the stripe group is preset in FIG. 2. In one example, the storage space for data storage in the stripe group is 64 GB and the storage space for storing parity data can be set to an appropriate size based on the requirements. For example, the width of the disk array is 4+1 and one stripe comprises five disk slices, wherein four of them are provided for storing data and one for storing parity data. Therefore, the size of the storage space for storing parity data is 16 GB when 64 GB data is stored. If the width of the disk array is 4+2, the size of the storage space for storing parity data is 32 GB when 64 GB data is stored.

In one example, the size of the disk slice is set to 4 GB. Accordingly, when the width of the disk array 104 is 4+1, 4 disk slices in one stripe are provided for storing 16 GB data and one disk slice is used for storing 4 GB parity data. The stripe group with a 64 GB storage space accordingly can include 4 stripes. As shown in FIG. 2, the disk slices in the stripe group 202 are from five different disks 208-1, 208-2, 208-3, 208-4 and 208-5 (collectively referred to as disk 208). At this time, each row of disk slices forms a stripe. Therefore, the stripe group includes four stripes.

According to FIG. 2, when the width of the disk array 104 is 8+1, disk slices in the stripe group 204 are from nine different disks 210-1, 210-2 . . . 210-9 and each row of disk slices constitutes a stripe. In this case, the stripe group consists of two stripes. If the width of the disk array is 16+1 as show in FIG. 2, the disk slices in the stripe group 206 come from 17 different disks 212-1, 212-2 . . . 212-17. In this case, 17 disk slices form one stripe, i.e., the strip group only includes one stripe. The above examples are provided only for the purpose of explaining the present disclosure, rather than restricting it. The number of stripes included in the stripe group and the size of the stripe group can be set based the requirements.

Return to FIG. 1. The disk array 104 also includes one or more layers and FIG. 1 illustrates that the disk array includes a layer 112 only for the sake of illustration. The above examples are provided only for the purpose of explaining the present disclosure, rather than restricting it. Any suitable number of layers can be set based on the requirements.

The layer 112, which is read and/or called by the mapper 102, comprises one or more stripe groups. Alternatively or additionally, the stripe groups in the layer 112 have identical disk array format. In one example, different layers can have different disk array formats. In another example, different layers can have identical disk array format.

In some examples, the stripe groups in the layer 112 can have suitable disk array types and/or disk array widths. For example, the stripe group adopts RAID 5 with a disk array width of 4+1, RAID 5 with a disk array width of 8+1 or RAID 5 with a disk array width of 16+1. The above examples are provided only for the purpose of explaining the present disclosure, rather than restricting it. Stripe groups in the layer can employ any suitable disk array types and disk array widths based on the requirements.

The example storage system 100 and the structure of the stripe group have been described above by FIG. 1 and FIG. 2. A flowchart of a method of data processing will be described in details below with reference to FIG. 3.

In order to adjust the width of the disk array, it is required to determine whether the disk array 104 has sufficient space available for adjusting the width of the disk array. In one example, it is required that the disk array 104 determines whether it contains a space of a stripe group. If the disk array 104 has the space of a stripe group, the mapper 102 can be requested to adjust the width of the disk array. In a further example, the disk array can determine, based on any appropriate conditions, whether the width of the disk array should be adjusted.

If having sufficient space for adjusting the disk array width, the disk array 104 sends to the mapper 102 a first request for adjusting the width of the disk array. In one example, the request includes source identification information of a source stripe group in the disk array 104. Alternatively or additionally, the request also comprises the disk array type and/or the disk array width (also referred to as second width) to which the source stripe group is adjusted. Alternatively or additionally, the request also includes layer identification information.

Figure 3:
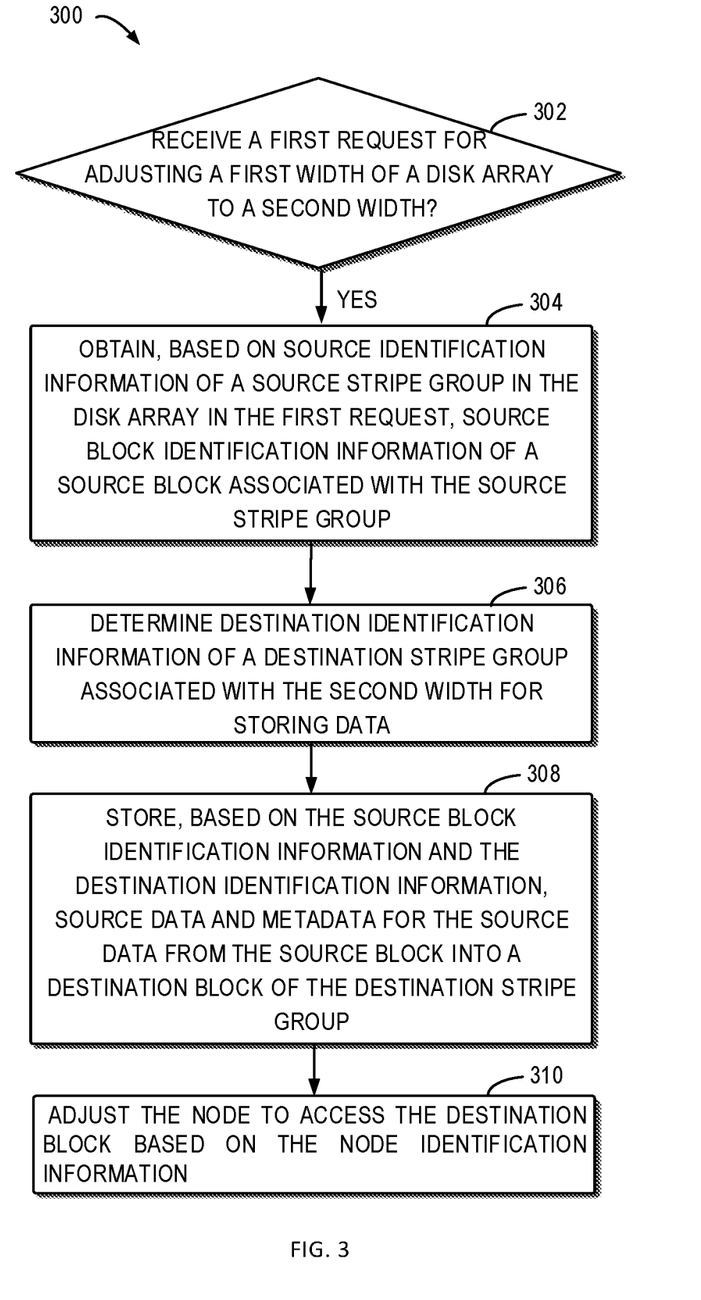
FIG. 3 graphically illustrates a schematic diagram of a procedure 300 for data processing in accordance with embodiments of the present disclosure.

It is determined, at block 302, whether a first request for adjusting a first width of the disk array to a second width is received. If the first request is received, the source block identification information of a source block associated with the source stripe group is obtained based on source identification information of the source stripe group of the disk array in the first request. The width of the disk array refers to the number of disks constituting the stripes in the disk array.

The mapper 102 can obtain a mapping relation between the source identification information of the source stripe group and the source block identification information of the source block. When the mapper 102 receives the request, source block identification information associated with the source stripe group is found in accordance with the mapping relation between the source identification information and the source block identification information stored in the mapper. In one example, the mapper 102 is stored therein with the mapping relation between the source identification information of the source stripe group and the source block identification information of the source block. In another example, other devices associated with the mapper 102 are also stored therein with the mapping relation between the source identification information of the source stripe group and the source block identification information of the source block. In one example, the source block is a physical large block of 2 MB. The above contents are examples only and do not restrict the present disclosure. The size of the source block can be set to any suitable values based on the requirements.

Destination identification information of a destination stripe group associated with the second width for storing data is determined at block 306. When the width of the disk array is being adjusted, a destination stripe group having a second width for storing data is also need to be set. The conversion of disk array width is implemented by storing data in the source stripe group into the destination stripe group.

In one example, after obtaining source block identification information of all source blocks associated with the source identification information of the source stripe group, the mapper 102 sends to the disk array a second request for obtaining the destination stripe group. Alternatively or additionally, the request includes types and widths of the disk array for the destination stripe group. The above contents are examples only and do not restrict the present disclosure. The request can include any suitable information required for generating the destination stripe group.

In a further example, the mapper 102 can send to the disk array a request for obtaining the destination stripe group upon the receipt of the first request or at any other suitable time.

The disk array 104 creates, based on the received second request, a destination stripe group with a second width. After creating the destination stripe group, the disk array 104 sends the destination identification information of the destination stripe group to the mapper 102 for its use of the destination stripe group. In one example, the destination identification information of the destination stripe group is address information. In another example, the destination identification information can be any other information which can identify the destination stripe group.

The source data and the metadata for the source data from the source blocks are stored, at block 308, into destination blocks of the destination stripe group based on the source block identification information and the destination identification information. The metadata includes node identification information of nodes for accessing the source blocks.

The mapper can obtain, from the disk array 104, source data and metadata for the source data stored in each source block via the identification information of the source blocks. In one example, the metadata is stored inside a header of a source block. In a further example, the metadata is stored therein with address information for accessing nodes inside the source block.

Afterwards, the mapper 102 stores the source data and the metadata for the source data into destination blocks of the destination stripe group based on the obtained destination identification information.

The nodes are adjusted, based on the node identification information, to access the destination blocks at block 310. A user or other process accesses data within the disk array through the node. Accordingly, when the source data and the metadata inside the source blocks are adjusted to the destination blocks, it is required to adjust the source block identification information inside the nodes to destination block identification information, so as to facilitate users or other processes to access the data after the adjustment of storage position.

The width of the disk array is dynamically adjusted through the above method. Such dynamic adjustment not only increases utilization efficiency of the disks, but also improves performance and service capability of disk arrays because the use of the disk arrays by users are not ceased when the width of the disk array is being adjusted.

Figure 4:
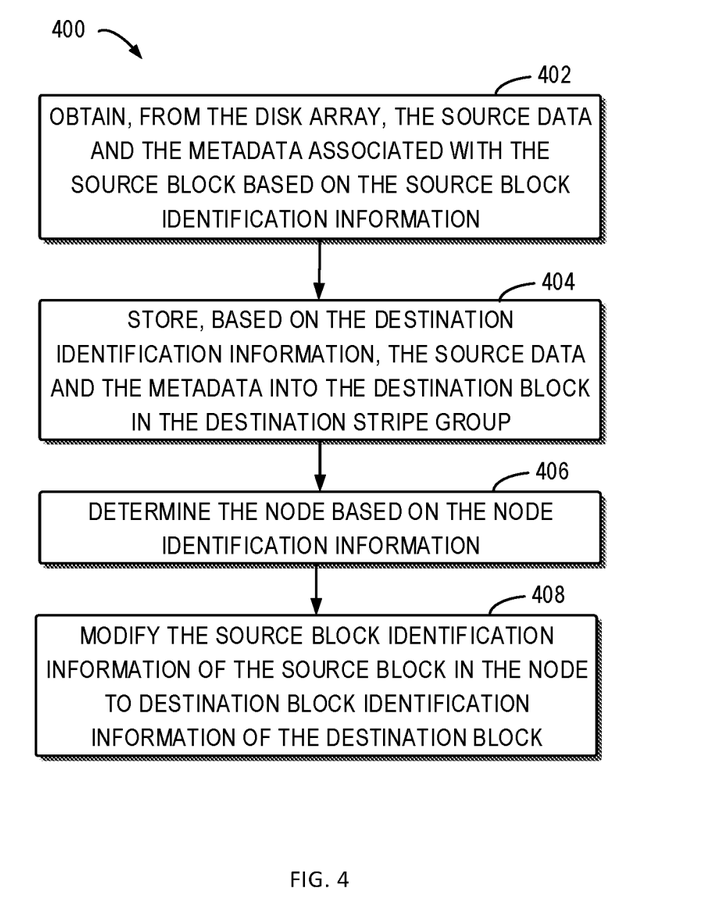
FIG. 4 graphically illustrates a schematic diagram of a procedure 400 for adjusting width in accordance with embodiments of the present disclosure.

FIG. 3 has described the method for data processing and procedures of data processing in the above blocks 308 and 310 will be described in details below with reference to examples of FIGS. 4 and 5. FIG. 4 depicts how the procedure of storing data in source blocks into destination stripe groups is implemented and FIGS. 5A-5C demonstrates an example 500 corresponding to the above procedure.

The mapper 102 can obtain, from the disk array, source data and metadata associated with source blocks based on the source block identification information at block 402. In one example, the mapper 102 can send the source block identification information to the disk array, which obtains blocks corresponding to the source block identification information based on the source block identification information. Alternatively or additionally, the blocks are Physical Large Blocks (PLB) of 2 MB. Data within the blocks are distributed over a plurality of disks corresponding to the width of the stripe group.

When the source block is determined, source data and the metadata for the source data stored in the source block are loaded into the mapper 102. In one example, the metadata includes node identification information for accessing nodes of the source block.

When users or processes access the data inside the RAID via the mapper 102, data within the corresponding physical blocks are looked up through nodes of the virtual logical blocks, wherein the nodes of the virtual logical blocks are stored therein with source block identification information of the source block to enable the node to point to the source block. The metadata in the source block is also stored therein with node identification information which can access the source block. The nodes accessing the source block can be determined by the node identification information stored in the metadata.

Figure 5A:
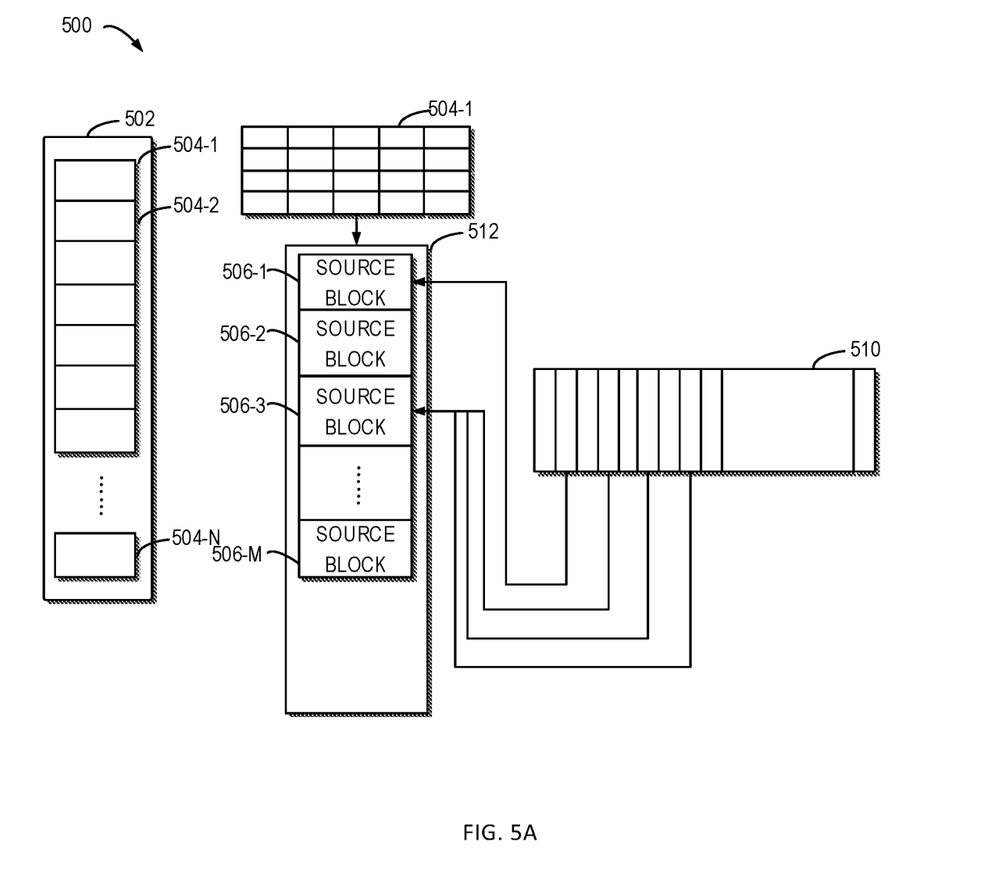
FIGS. 5A-5C graphically illustrate schematic diagrams of an example 500 for adjusting width in accordance with embodiments of the present disclosure.

In the example shown in FIG. 5A, the layer 502 is a layer in the disk array 104. The layer 502 includes one or more source stripe groups 504-1, 504-2 . . . 504-N (collectively referred to as source stripe group 504), where N is a positive integer greater than 1. In one example, the mapping relation between the layer 502 and the source stripe group 504 is stored in the disk array.

FIG. 5A also illustrates the specific structure of the source stripe group 504-1 and the disk array width corresponding to the source stripe group 504-1 is 4+1. The source stripe group 504-1 is stored therein with one or more source blocks 506-1, 506-2 . . . and 506-M (collectively referred to as source block 506), where M is a positive integer greater than 1. In one example, the mapping relation between the source identification information of the source stripe group 504-1 and the source block identification of the source block 506 is stored in the mapper 102. In one example, the mapping relation between the source identification information of the source stripe group 504-1 and the source block identification of the source block 506 is stored in a memory associated with the mapper 102.

Users or Input/Output requests find the corresponding source blocks via a logical address block 510 in the mapper 102. In FIG. 5A, there is a mapping relation between a second node in the logical address block and the source block 506-1, so data associated with the second node in the logical address block is stored in the source block 506-1. There are also mapping relations between fourth, sixth and eighth nodes in the logical address block and the source block 506-3.

At block 404, the source data and the metadata are stored to destination blocks in the destination stripe group based on the destination identification information. The mapper 102, after obtaining the source data and the metadata within the source block, stores the source data and the metadata into destination data blocks in the destination stripe group.

In one example, logical block addresses in the destination stripe group where the destination data blocks are stored are identical to logical block addresses of source blocks in the source stripe group. In one example, a node is stored therein with source block identification information, respective length of data in node and shift of data corresponding to the node in the block. Therefore, based on the above setting, when the transfer of the source data and the metadata is completed, it is required to adjust only the source block identification information within the node instead of other information, which enhances speed and efficiency of data adjustment.

Figure 5B:
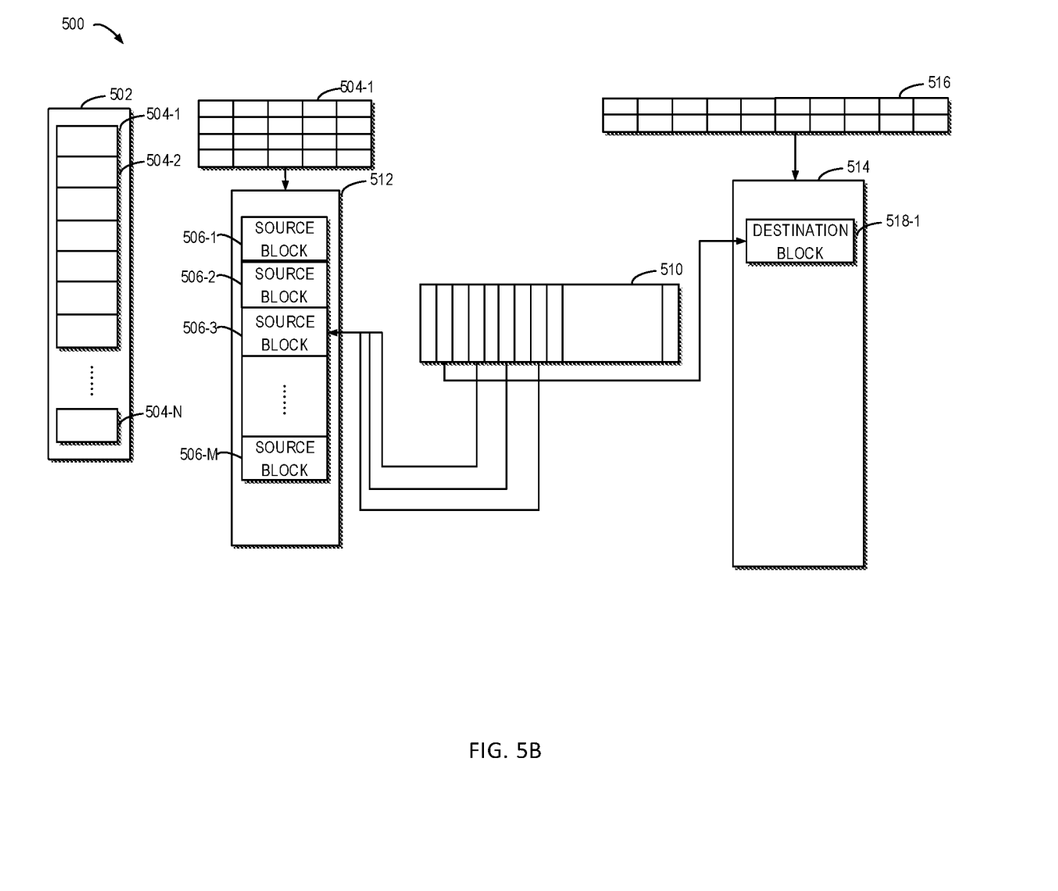

Source data and metadata for the source data in the source block 506-1 are read, as shown in FIG. 5B. The source data and the metadata are then stored to the destination block 518-1 of the destination stripe group 516, wherein the destination block 518-1 has the same logical block address in the logical address space 514 of the destination stripe group 516 as the logical block address that the source block 506-1 has in the logical address space 512 of the source stripe group 504-1. For example, data in the first source block of the source stripe group 504-1 are stored in a first destination block of the destination stripe group 516.

The mapper 102 determines a node based on the node identification information at block 406. In one example, the node is stored in an external storage device and it is required to read the node from the external device into the memory to operate the node when the node is determined by the node identification information in the metadata. The above examples are provided only for describing the present disclosure, rather than restricting it. The node can be stored at any suitable positions.

According to FIG. 5A, the metadata in the source block 506-1 is also stored with node identification information pointing to the source block 506-1. It can be determined that which nodes in the virtual logical block 510 point to the source block 506-1 based on the node identification information.

The source block identification information of the source block in the node is modified to the destination block identification information of the destination block at block 408. The identification information of the blocks within the node is adjusted to make the node point to the destination block.

According to FIG. 5B, when the data in the source block 506-1 is stored into the destination block 518-1, the source block identification information of the source block 506-1 within node pointing to the source block 506-1 is modified to the destination block identification information of the destination block 518-1. Accordingly, the second node in the virtual logical block 510 points to the destination block 518-1 and the users can look up the corresponding data in the destination block 518-1 when accessing the data associated with the second node.

The data in the stripe group having the first disk array width can be stored in a stripe group having a second disk array width through the above operations, so as to adjust the width of the disk array and improve data storage capacity. In addition, the adjusted data can be accurately found by adjusting the mapping relation between the data.

In one example, a read lock is provided for the source block to prevent other applications or processes from modifying data in the block when width conversion is performed on the data within the block. Alternatively or additionally, a write lock is added on the node when the node is being read. Alternatively of additionally, the write lock of the node and the read lock of the source block are released when data within the source block is transferred to the destination block and the source block identification information within the node is modified to the destination block identification information.

The above operations can prevent other applications or processes to read or write the nodes, which ensures data consistency and avoids the data from being modified during the adjustment.

In case of processing the data in the source stripe, if there are Input/Output requests hitting the source data in the source block under processing, these Input/Output requests are queued. The Input/Output operations are performed in sequence on the data after completing the width conversion of the stripe for the source data.

In this way, when the width conversion is performed on the data in the data blocks, data inconsistency brought by operations of the Input/Output requests on the data involved in the conversion can be avoided and the data availability can be guaranteed.

The above FIG. 5B graphically illustrates a procedure of transferring data in a source block. In FIG. 5C, data of all source blocks 506-2 . . . 506-M in the source stripe group 504-1 are transferred to the destination blocks 518-2 . . . 518-M in the destination stripe group 516.

The disk array 104 is stored therein with a mapping relation between layers and source stripe groups. If the width adjustment for the source stripe group is completed within the mapper 102, the destination identification information is sent to the disk array, so as to replace source identification information of the source stripe group in the mapping relation between layers and source stripe groups with destination identification information of the destination stripe group, thereby forming a mapping relation between layers and destination identification information of destination stripe groups.

Figure 5C:
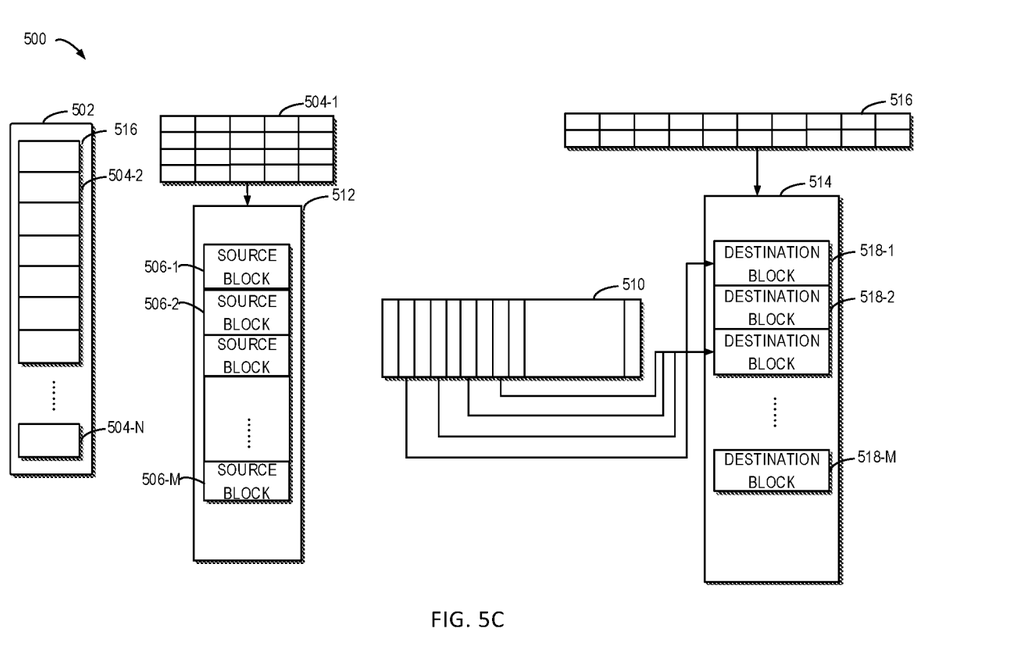

As shown in FIG. 5C, when the data in the source stripe group 504-1 are transferred to the destination block 518-1, the mapper 102 will send new destination identification information of the destination stripe group 516 to the disk array 104. In the mapping relation between the layer 502 and the source stripe group in the disk array 104, the source identification information of the source stripe group 504-1 is modified to the destination identification information of the destination stripe group 516.

The above operations can adjust the width of data stripe, timely update the mapping relation, ensure accuracy of data storage and avoid errors in the data storage procedure.

After data of the source stripe group 504-1 is stored to the destination stripe group 516, the storage space associated with the source stripe group 504-1 can be released as new storage space. Then, the disk array 102 initiates a width conversion for a next stripe group in the layer again until the width conversion of all stripe groups is completed. Finally, the width conversion is performed for disk arrays of all data in the layer.

Alternatively or additionally, if the disk array has a plurality of layers, the width conversion can be performed for another layer when the width conversion is completed for one layer.

Figure 6:
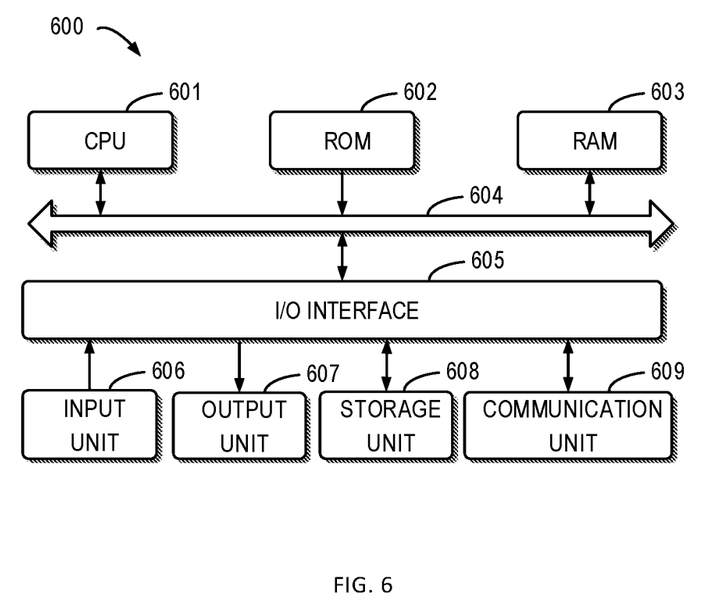
FIG. 6 graphically illustrates a schematic block diagram of an example device 600 suitable for implementing embodiments of the present disclosure.

FIG. 6 illustrates a schematic block diagram of an example device 600 for implementing embodiments of the present disclosure. For example, any one of 102, 104, 110 and 112 shown in FIG. 1 can be performed by the device 600. As shown, the device 600 includes a central process unit (CPU) 601, which can execute various suitable actions and processing based on the computer program instructions stored in the read-only memory (ROM) 602 or computer program instructions loaded in the random-access memory (RAM) 603 from a storage unit 608. The RAM 603 can also store all kinds of programs and data required by the operations of the device 600. CPU 601, ROM 602 and RAM 603 are connected to each other via a bus 604. The input/output (I/O) interface 605 is also connected to the bus 604.

A plurality of components in the device 600 is connected to the I/O interface 605, including: an input unit 606, such as keyboard, mouse and the like; an output unit 607, e.g., various kinds of display and loudspeakers etc.; a storage unit 608, such as disk, optical disk etc.; and a communication unit 609, such as network card, modem, wireless transceiver and the like. The communication unit 609 allows the device 600 to exchange information/data with other devices via the computer network, such as Internet, and/or various telecommunication networks.

The above described various procedures and processing, such as methods 300 and 400, can be executed by the processing unit 601. For example, in some embodiments, methods 300 and 400 can be implemented as computer software programs tangibly included in the machine-readable medium, such as storage unit 608. In some embodiments, the computer program can be partially or fully loaded and/or mounted to the device 600 via ROM 602 and/or communication unit 609. When the computer program is loaded to RAM 603 and executed by the CPU 601, one or more actions of the above described methods 300 and 400 can be executed.

The present disclosure can be method, apparatus, system and/or computer program product. The computer program product can include a computer-readable storage medium loaded with computer-readable program instructions for executing various aspects of the present disclosure.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed here with reference to the flow chart and/or block diagram of method, apparatus (system) and computer program product according to embodiments of the present disclosure. It should be understood that each block of the flow chart and/or block diagram and combinations of each block in the flow chart and/or block diagram can be implemented by the computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only by way of example rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

We claim:

1. A method of data processing, comprising:
   in response to receiving a first request for adjusting a first width of a disk array to a second width, obtaining, based on source identification information of a source stripe group in the disk array in the first request, source block identification information of a source block associated with the source stripe group;
   determining destination identification information of a destination stripe group associated with the second width for storing data;
   storing, based on the source block identification information and the destination identification information, source data and metadata for the source data from the source block into a destination block of the destination stripe group, the metadata including node identification information for accessing nodes of the source block; and
   adjusting at least one node in a mapping between logical addresses and physical addresses to access the destination block based on the node identification information, at least in part by modifying source block identification information of the source block in the node to destination block identification information of the destination block, wherein the mapping between logical addresses and physical addresses comprises a B+tree that is used to map at least one address in at least user request to physical space, and wherein the mapping is within a mapper that received, from the disk array, the first request for adjusting the first width of the disk array to the second width.

2. The method of claim 1, wherein determining destination identification information of a destination stripe group associated with the second width for storing data comprises:
   sending to the disk array a second request for obtaining the destination stripe group; and
   receiving, from the disk array, the destination identification information of the destination stripe group determined based on the second request.

3. The method of claim 1, wherein storing source data and metadata for the source data from the source block into a destination block of the destination stripe group comprises:
   obtaining, from the disk array, the source data and the metadata associated with the source block based on the source block identification information; and
   storing, based on the destination identification information, the source data and the metadata into the destination block in the destination stripe group.

4. The method of claim 1, wherein adjusting the node to access the destination block further comprises:
   determining the node based on the node identification information.

5. The method of claim 1, further comprising:
   in response to an Input/Output (I/O) request hitting the source data in the source block being processed, queuing the I/O request.

6. The method of claim 1, further comprising:
   in response to an adjustment for a width of the source stripe group being completed, sending the destination identification information to the disk array to replace the source identification information in a mapping related to the source stripe group.

7. An electronic device for data processing, comprising:
   a processor; and
   a memory having computer program instructions stored thereon, the processor executing the computer program instructions in the memory to control the electronic device to perform acts including:
   in response to receiving a first request for adjusting a first width of a disk array to a second width, obtaining, based on source identification information of a source stripe group in the disk array in the first request, source block identification information of a source block associated with the source stripe group;
   determining destination identification information of a destination stripe group associated with the second width for storing data;
   storing, based on the source block identification information and the destination identification information, source data and metadata for the source data from the source block into a destination block of the destination stripe group, the metadata including node identification information for accessing nodes of the source block; and
   adjusting at least one node in a mapping between logical addresses and physical addresses to access the destination block based on the node identification information, at least in part by modifying source block identification information of the source block in the node to destination block identification information of the destination block, wherein the mapping between logical addresses and physical addresses comprises a B+tree that is used to map at least one address in at least user request to physical space, and wherein the mapping is within a mapper that received, from the disk array, the first request for adjusting the first width of the disk array to the second width.

8. The electronic device of claim 7, wherein determining destination identification information of a destination stripe group associated with the second width for storing data comprises:

sending to the disk array a second request for obtaining the destination stripe group; and receiving, from the disk array, the destination identification information of the destination stripe group determined based on the second request.

9. The electronic device of claim 7, wherein storing source data and metadata for the source data from the source block into a destination block of the destination stripe group comprises:

obtaining, from the disk array, the source data and the metadata associated with the source block based on the source block identification information; and storing, based on the destination identification information, the source data and the metadata into the destination block in the destination stripe group.

10. The electronic device of claim 7, wherein adjusting the node to access the destination block further comprises:

determining the node based on the node identification information.

11. The electronic device of claim 7, wherein the acts further comprise:

in response to an Input/Output (I/O) request hitting the source data in the source block being processed, queuing the I/O request.

12. The electronic device of claim 7, wherein the acts further comprise:

in response to an adjustment for a width of the source stripe group being completed, sending the destination identification information to the disk array to replace the source identification information in a mapping related to the source stripe group.

13. A computer program product having a non-transitory computer readable medium which stores a set of instructions to perform data processing; the set of instructions, when carried out by computerized circuitry, causing the computerized circuitry to perform a method of:

in response to receiving a first request for adjusting a first width of a disk array to a second width, obtaining, based on source identification information of a source stripe group in the disk array in the first request, source block identification information of a source block associated with the source stripe group;

determining destination identification information of a destination stripe group associated with the second width for storing data;

storing, based on the source block identification information and the destination identification information, source data and metadata for the source data from the source block into a destination block of the destination stripe group, the metadata including node identification information for accessing nodes of the source block; and adjusting at least one node in a mapping between logical addresses and physical addresses to access the destination block based on the node identification information, at least in part by modifying source block identification information of the source block in the node to destination block identification information of the destination block, wherein the mapping between logical addresses and physical addresses comprises a B+tree that is used to map at least one address in at least user request to physical space, and wherein the mapping is within a mapper that received, from the disk array, the first request for adjusting the first width of the disk array to the second width.

14. The method of claim 1, wherein the source block and the destination block comprise physical blocks.

* * * * *